No. 690,209. Patented Dec. 31, 1901.
W. WADDILL.
SPROUT PULLER.
(Application filed Oct. 7, 1901.)
(No Model.)
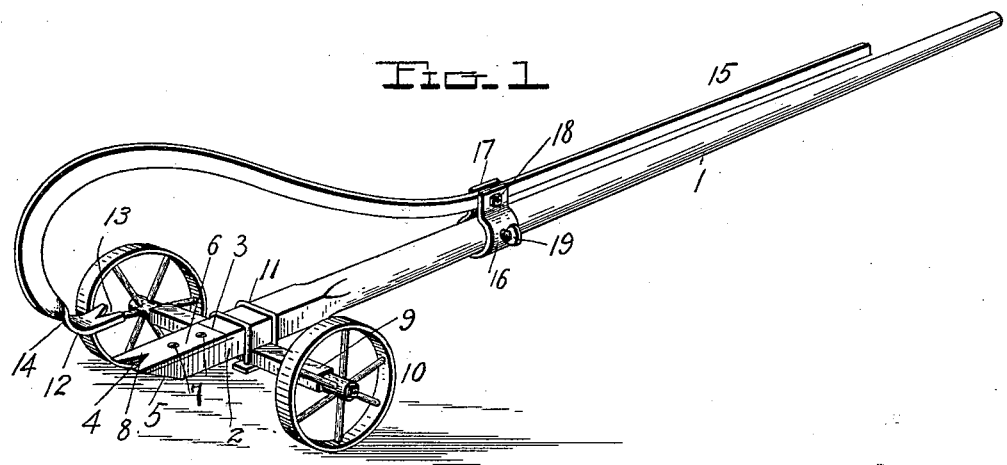
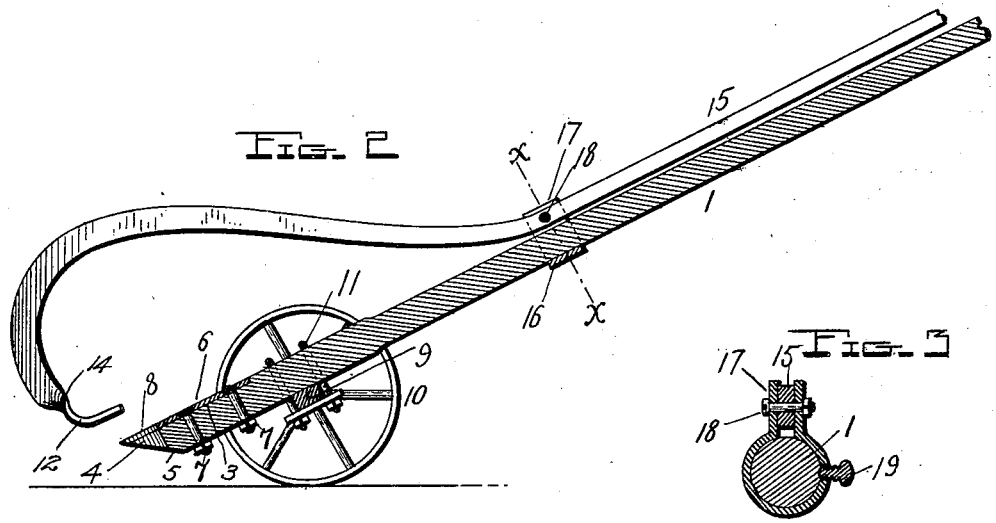
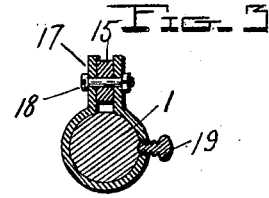
Inventor
W. Waddill
Witnesses
By H. B. Willson & Co.
Attorneys

UNITED STATES PATENT OFFICE.

WILLIAM WADDILL, OF PARIS, ARKANSAS.

SPROUT-PULLER.

SPECIFICATION forming part of Letters Patent No. 690,209, dated December 31, 1901.

Application filed October 7, 1901. Serial No. 77,878. (No model.)

*To all whom it may concern:*

Be it known that I, WILLIAM WADDILL, a citizen of the United States, residing at Paris, in the county of Logan and State of Arkansas, have invented certain new and useful Improvements in Grub or Sprout Pullers; and I do declare the following to be a full, clear, and exact description of the invention, such as will enable others skilled in the art to which it appertains to make and use the same.

The invention relates to a grub or sprout puller.

The object of the invention is to provide an implement of this character which shall be simple of construction, durable in use, comparatively inexpensive of production, and efficient in action.

With this and other objects in view the invention consists of certain novel features of construction, combination, and arrangement of parts, which will be hereinafter more fully described, and particularly pointed out in the appended claim.

In the accompanying drawings, Figure 1 is a perspective view of my improved grub or sprout puller. Fig. 2 is a longitudinal vertical sectional view of the same, and Fig. 3 is a cross-sectional view on lines $x$ $x$ of Fig. 2.

Referring to the drawings, 1 denotes a handle having one end squared, as shown at 2, said squared portion having a recess 3 formed in its upper face, a V-shaped notch 4, and a beveled end 5. A plate 6 is fitted in said recess and is secured to the handle by bolts 7 and provided with a V-shaped notch 8, which registers with the V-shaped notch 4.

9 denotes an axle carrying wheels 10, and 11 denotes clips for connecting the axle to the squared portion of the handle.

12 denotes a jaw, preferably constructed of metal and provided with a V-shaped notch 13. This jaw when constructed of metal is given a quarter-twist, as shown at 14, and is then curved upwardly and rearwardly and formed with a handle extension 15, which is adjustably secured to the handle 1 by a sliding collar 16, having parallel ears 17, between which the handle extension is pivoted by a bolt 18. A set-screw 19 locks the collar 16 to the handle 1 in its adjusted position.

In operation a sprout or grub is engaged with the notch 4 of the handle 1, and the jaw 12 is then swung downward to also engage the sprout or grub. The grub or sprout is now held firmly between the jaws, and by depressing the outer end of the handle 1 the grub or sprout will be pulled out by the roots. By making the collar 16 adjustable upon the handle 1 the V-shaped jaw may be quickly set in proper relation with the plate 6.

From the foregoing description, taken in connection with the accompanying drawings, the construction, mode of operation, and advantages of the invention will be readily understood without requiring a more extended explanation.

Having thus described my invention, what I claim, and desire to secure by Letters Patent, is—

The combination with an axle and its supporting-wheels, of a handle having a squared portion formed with a recess at one end, a beveled end and a V-shaped notch, a plate fitted in said recess and having a corresponding notch, and secured to the handle, clips connecting the squared portion of the handle to the axle, whereby the handle is prevented from turning, a collar mounted upon said handle and provided with parallel ears, a jaw having a V-shaped notch adapted to coact with the notch of said plate and having a handle extension pivoted between the parallel ears, and a set-screw for adjustably clamping the collar to the handle, substantially as set forth.

In testimony whereof I have hereunto set my hand in presence of two subscribing witnesses.

WILLIAM WADDILL.

Witnesses:
C. C. SADLER.
ANTHONY HALL.